United States Patent
Hsu et al.

(10) Patent No.: US 10,101,806 B2
(45) Date of Patent: Oct. 16, 2018

(54) TELEVISION SET AND METHOD FOR AUTOMATICALLY ADJUSTING VISUAL HEIGHT OF TELEVISION SET

(71) Applicant: MiiCs & Partners (Shenzhen) Co., Ltd., Shenzhen (CN)

(72) Inventors: Hsin-Wen Hsu, New Taipei (TW); Yu-Ting Wang, New Taipei (TW); Hsiao-Ping Chiu, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 362 days.

(21) Appl. No.: 14/826,601

(22) Filed: Aug. 14, 2015

(65) Prior Publication Data

US 2016/0224105 A1 Aug. 4, 2016

(30) Foreign Application Priority Data

Feb. 3, 2015 (TW) .............................. 104103630 A

(51) Int. Cl.
*H04N 5/64* (2006.01)
*G06F 3/01* (2006.01)
*G06K 9/00* (2006.01)

(52) U.S. Cl.
CPC ......... *G06F 3/012* (2013.01); *G06K 9/00369* (2013.01); *H04N 5/64* (2013.01)

(58) Field of Classification Search
CPC ....... G06F 3/012; G06K 9/00369; H04N 5/64
See application file for complete search history.

(56) References Cited

U.S. PATENT DOCUMENTS

| | | | | |
|---|---|---|---|---|
| 7,813,822 B1* | 10/2010 | Hoffberg | ............ | G06K 9/00369 381/73.1 |
| 2002/0149613 A1* | 10/2002 | Gutta | ............ | G06F 3/011 715/728 |
| 2008/0276178 A1* | 11/2008 | Fadell | ............ | G02B 27/017 715/733 |
| 2009/0025022 A1* | 1/2009 | Blatchley | ............ | H04H 60/33 725/9 |
| 2011/0093887 A1* | 4/2011 | Jang | ............ | G09G 5/02 725/37 |

(Continued)

FOREIGN PATENT DOCUMENTS

| | | |
|---|---|---|
| CN | 101964883 A | 2/2011 |
| CN | 204005065 U | 12/2014 |
| TW | 201242359 A1 | 10/2012 |

*Primary Examiner* — Sathyanaraya V Perungavoor
*Assistant Examiner* — Howard D Brown, Jr.
(74) *Attorney, Agent, or Firm* — ScienBiziP, P.C.

(57) ABSTRACT

A television set is connected to a sensor and a height adjusting apparatus. The sensor detects location information of a user, a watching mode of the user, a visual angle of the user and a neck deviation angle of the user, by using the sensor when the television set is turned on. The television set calculates a proper height for the user under different watching modes, according to the location information of the user, the watching mode of the user, and the visual angle and the neck deviation angle of the user. The television set further controls the height adjusting apparatus to adjust the visual height of the television set according to the calculated proper height of the television. A method for automatically adjusting the visual height of the television set is also provided.

10 Claims, 5 Drawing Sheets

(56) References Cited

U.S. PATENT DOCUMENTS

| | | | |
|---|---|---|---|
| 2012/0075166 A1* | 3/2012 | Marti | G06F 3/011 |
| | | | 345/1.1 |
| 2012/0092172 A1* | 4/2012 | Wong | G06F 3/011 |
| | | | 340/575 |
| 2013/0110004 A1* | 5/2013 | McLane | A61B 5/4561 |
| | | | 600/587 |
| 2014/0153168 A1* | 6/2014 | Hida | H05K 7/02 |
| | | | 361/679.01 |
| 2015/0042556 A1* | 2/2015 | Tao | G06F 3/012 |
| | | | 345/156 |
| 2015/0332090 A1* | 11/2015 | Kumamoto | G06K 9/00912 |
| | | | 348/222.1 |
| 2016/0004140 A1* | 1/2016 | Tada | G03B 15/07 |
| | | | 396/2 |
| 2016/0045108 A1* | 2/2016 | Wu | A61B 3/113 |
| | | | 351/210 |
| 2017/0068314 A1* | 3/2017 | Fu | G06F 3/013 |

* cited by examiner

TELEVISION SET AND METHOD FOR AUTOMATICALLY ADJUSTING VISUAL HEIGHT OF TELEVISION SET

CROSS-REFERENCE TO RELATED APPLICATIONS

This application claims priority to Taiwanese Patent Application No. 104103630 filed on Feb. 3, 2015 in the Taiwan Intellectual Property Office.

FIELD

The subject matter herein generally relates to television sets, and particularly to a television set and a method for automatically adjusting visual height of the television set.

BACKGROUND

A television set can be configured to have a fixed height. A stand can extend from the television set to provide stability. The stand can be configured to rest on an entertainment piece of furniture. In other implementations, the television set can be mounted to a wall.

BRIEF DESCRIPTION OF THE DRAWINGS

Implementations of the present technology will now be described, by way of example only, with reference to the attached figures.

DETAILED DESCRIPTION

Figure 1:
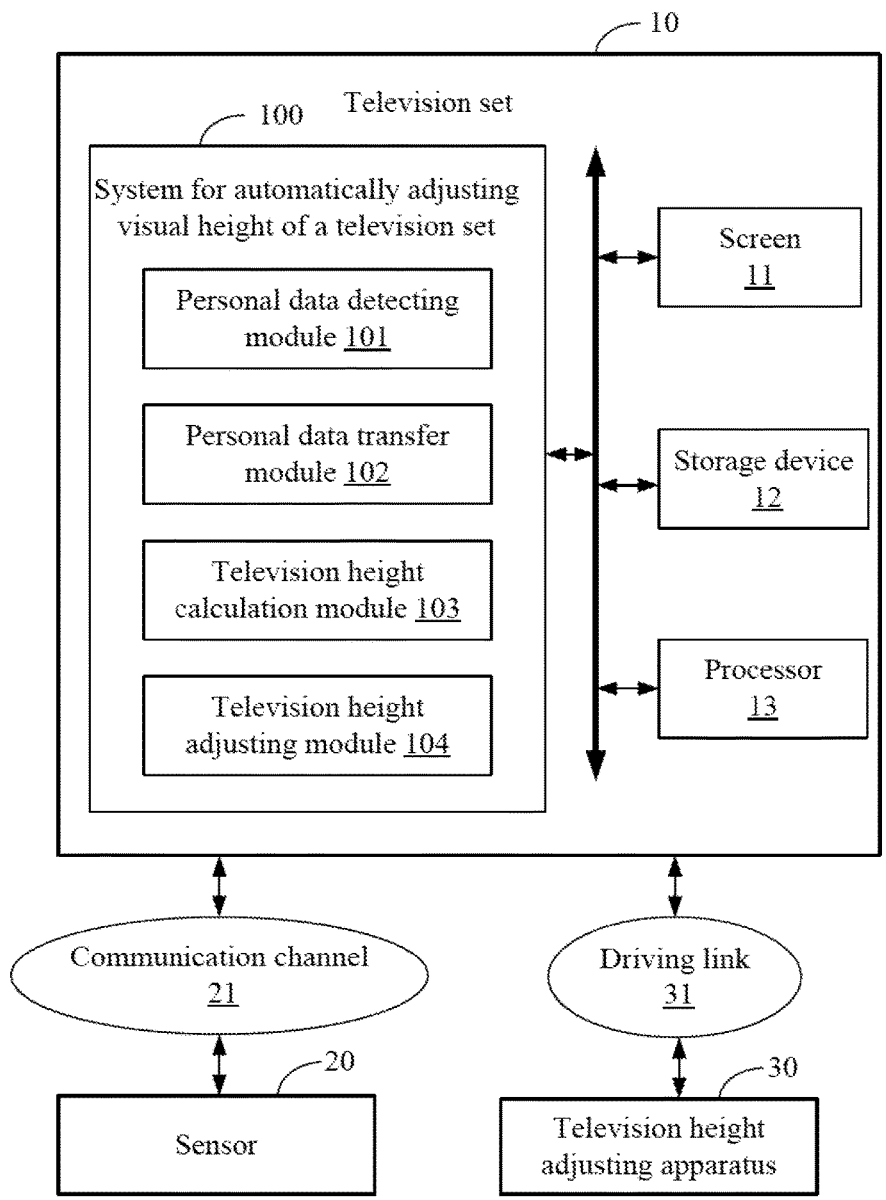
FIG. 1 is a block diagram illustrating an embodiment of an application environment of a television set.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "comprising" means "including, but not necessarily limited to", it specifically indicates open-ended inclusion or membership in a so-described combination, group, series and the like.

FIG. 1 illustrates an embodiment of an application environment of a television set 10. In at least one embodiment, the television set 10 includes a screen 11, a storage device 12, and a processor 13. The storage device 12 can be an internal storage system, such as a flash memory, a random access memory for temporary storage of information, and/or a read-only memory for permanent storage of information. The first storage device 12 can also be a storage system, such as a hard disk, a storage card, or a data storage medium. The processor 13 can be a Programmable Logic Controller (PLC), a Micro-programmed Control Unit (MCU), a Central Processing Unit (CPU), a Digital Signal Processor (DSP), or a single chip, for example. The storage device 12 is coupled to the processor 13, for example by using a data bus.

The television set 10 communicates with a sensor 20 via a communication channel 21. In at least one embodiment, the sensor 20 can be an infrared ray proximity sensor, a laser proximity sensor, a sonic proximity sensor, an eye tracker, a camera, a temperature sensor, or a combination of a variety of sensors, for example. The communication channel 21 can be achieved by using a wired network, a wireless network (for example, BLUETOOTH, Wi-Fi), Near Field Communication (NFC), radio frequency identification devices, and QR code, for example.

The television set 10 is further connected to a height adjusting apparatus 30 via a driving link 31. In at least one embodiment, the height adjusting apparatus 30 can be a commonly used mechanical device including a gear, a rail, nuts and bolts, and a worm gear. The height adjusting apparatus 30 further can be a commonly used pneumatic device including an air cylinder and a push-pull rod. The height adjusting apparatus 30 also can be a commonly used hydraulic driving device, a spring driving device, a telescopic hanging rack, an adjustable TV ark, and other devices capable of adjusting height. The driving link 31 can be achieved by using, for example, a mechanical drive, a pneumatic drive, hydrostatic drive, spring drive.

A system 100 for automatically adjusting the visual height of the television set 10 is run in the television set 10. The system 100 can include a number of modules, which are a collection of software instructions stored in the first storage device 12 and executed by the processor 13. In at least one embodiment, the system 100 can include a personal data detecting module 101, a personal data transfer module 102, a television height calculation module 103, and a television height adjusting module 104.

When the television set 10 is turned on, the personal data detecting module 101 transmits a first control signal to the sensor 20 to control the sensor 20 to start to detect personal data of the user. In at least one embodiment, the personal data can include location information of the user, a watching mode of the user, and a visual angle and a neck deviation angle of the user.

Figure 2:
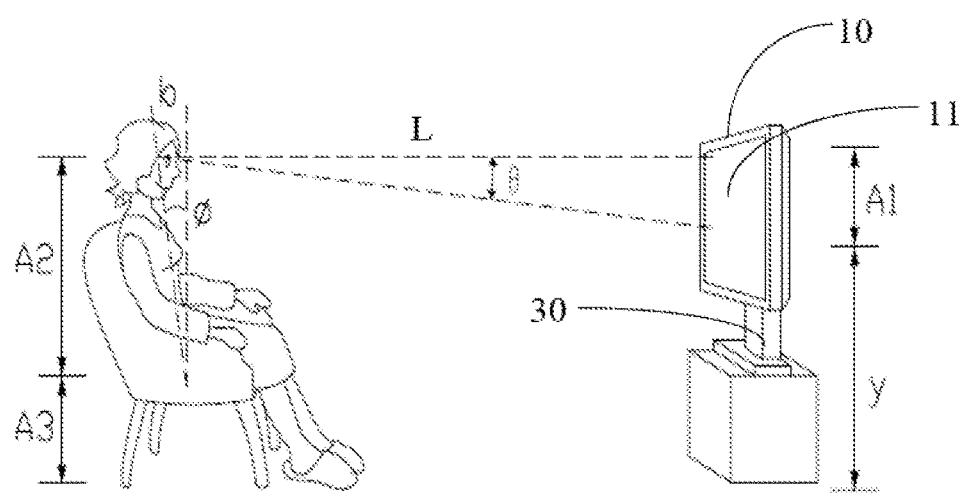
FIG. 2 is a diagram illustrating an embodiment of a user watches a television set in a sitting position.
Figure 3:
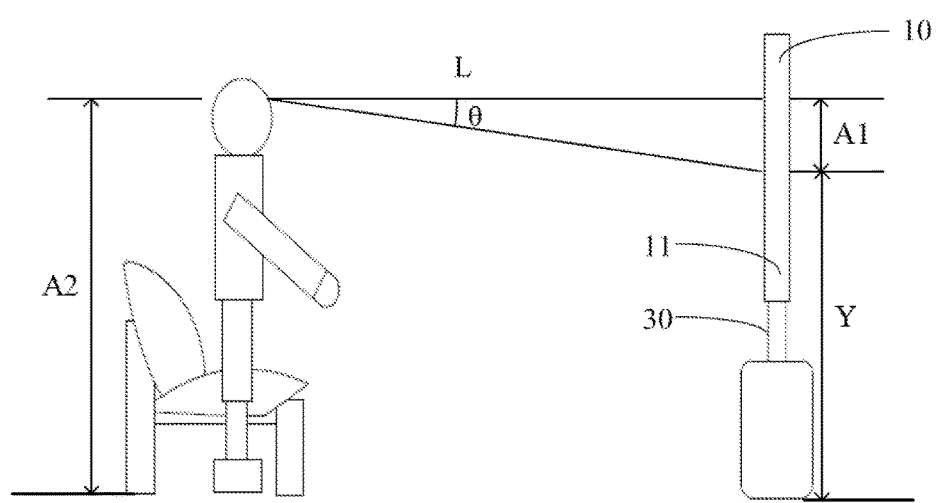
FIG. 3 is a diagram illustrating an embodiment of a user watches a television set in a standing position.
Figure 4:
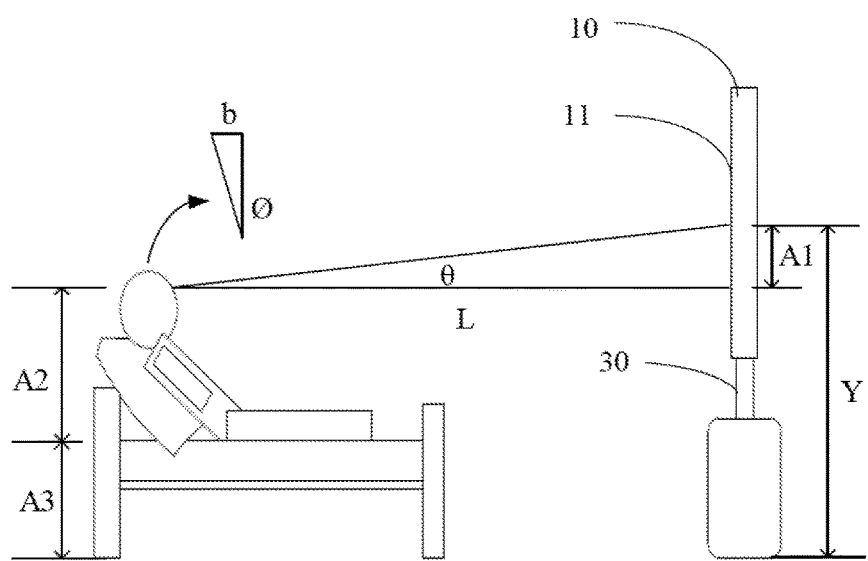
FIG. 4 is a diagram illustrating an embodiment of a user watches a television in a lying position.

In at least one embodiment, the location information of the user can include a distance between the eyes of the user and the center of the screen 11, a height between the eyes of the user and the seat that the user is sitting on, and a posture height of the user. The posture height of the user is equal to the height of a seat if the user is sitting on the seat watching the television set 10. The posture height of the user is equal to the height of a bed if the user is lying in the bed watching the television set 10. The posture height of the user is equal to the height of the horizontal plane of the user standing if the user standing on the horizontal plane while watching the television set 10. FIG. 2 to FIG. 4 illustrate the distance between the eyes of the user and the center of the screen 11 is "L", the height between the eyes of the user and the seat the user sitting on is "A2", and the posture height of the user is "A3". In FIG. 2, the user is sitting in a chair, watching the television set 10, thus the posture height of the user "A3" is equal to the height of the chair. In FIG. 3, the user is standing on the floor, watching the television set 10, thus the posture height of the user "A3" is zero. In FIG. 4, the user is lying in the bed, watching the television set 10, thus the posture of the user "A3" is equal to the height of the bed.

In at least one embodiment, the viewing mode of the user can include a sitting mode, a standing mode, and a lying mode. The sitting mode indicates that the user is sitting on a seat while watching the television set 10, see FIG. 2. The standing mode indicates that the user is standing while watching the television set 10, see FIG. 3. The lying mode indicates that the user is lying in the bed while watching the television set 10, see FIG. 4.

In at least one embodiment, the visual angle of the user is the angle between the line of sight of the user and a vertical line of the screen 11. For example, in FIG. 2 to FIG. 4, the visual angle of the user is θ. When the user watches the television set 10 in a sitting mode or in a lying mode, the neck deviation angle of the user is the angle between the neck of the user and the vertical direction, for example, in FIG. 2 and FIG. 4, the neck deviation angle of the user is Ø, and in FIG. 3, the neck deviation angle of the user is equal to zero.

The personal data transfer module 102 is configured to control the sensor 20 to transmit the personal data detected by the sensor 20 to the television set 10 via the communication channel 21. In at least one embodiment, the sensor 20 can be mounted on the seat the user is sitting on, on the bed the user is lying on, on a proper position of the television set 10, or any other position that is convenient for the sensor 20 to detect the personal data of the user.

The television height calculation module 103 is configured to calculate a proper visual height of the television set 10 for the user under different watching modes, according to the personal data detected by the sensor 20. In at least one embodiment, the proper height of the television set 10 is the proper height between the center of the screen 11 and the floor. In detail, in at least one embodiment, the television height calculation module 103 calculates the proper visual height according to the following formula: $Y=A1+A2+A3$, wherein "Y" is the proper height of the television set 10; "A1" is the height between the eyes of the user and the center of the screen 11, wherein $A1=[L+b] \times \tan(\theta)$, "θ" is the visual angle of the user, $\tan(\theta)$ is tangent value of "θ", "L" is the horizontal distance between the eyes of the user and the center of the screen 11, $b=A2 \times \tan(\emptyset)$, "Ø" is the neck deviation angle of the user, $\tan(\emptyset)$ is the tangent value of "Ø", "A2" is the height between the eyes of the user and the seat the user is sitting on, and "A3" is the posture height of the user.

For example, in FIG. 2, when the user watches the television set 10 in the sitting mode, the distance between the eyes of the user and the center of the screen 11 is L=400 cm, the height between the eyes of the user and the seat the user is sitting on is A2=112 cm, the posture height of the user is A3=44.6 cm, the visual angle of the user is θ=−5°, and the neck deviation angle of the user is Ø=10° as an example, the proper height of the television set 10 is $Y=[L+A2 \times \tan(\emptyset)] \times \tan(\theta)+A2+A3=[400+112) \times \tan(10°)] \times \tan(-5°)+112+44.6=119.88$ (cm).

For example, FIG. 3 illustrates when the user watches the television set 10 in the standing mode, the distance between the eyes of the user and the center of the screen 11 is L=400 cm, the height between the eyes of the user and the floor the user is standing on is A2=152 cm, the posture height of the user A3=0, the neck deviation angle of the user is Ø=0, and the visual angle of the user is θ=−5° as an example, the proper height of the television set 10 is $Y=[L \times \tan(\theta)]+A2+A3=[400] \times \tan(-5°)]+152+0=117$ (cm).

For example, in FIG. 4, when the user watches the television set 10 in the lying mode, the distance between the eyes of the user and the center of the screen 11 is L=400 cm, the height between the eyes of the user and the bed the user is lying on is A2=112 cm, the posture height of the user is A3=44.6 cm, the visual angle of the user θ=−5°, and the neck deviation angle of the user is Ø=10° as an example, the proper height of the television set 10 is $Y=[L+A2 \times \tan(\emptyset)] \times \tan(\theta)+A2+A3=[400+112) \times \tan(10°)] \times \tan(-5°)+112+58.6=127.38$ (cm).

The television height adjusting module 104 is configured to generate a second control signal to trigger the height adjusting apparatus 30 to adjust the height of the television set 10, according to the calculated proper height.

Figure 5:
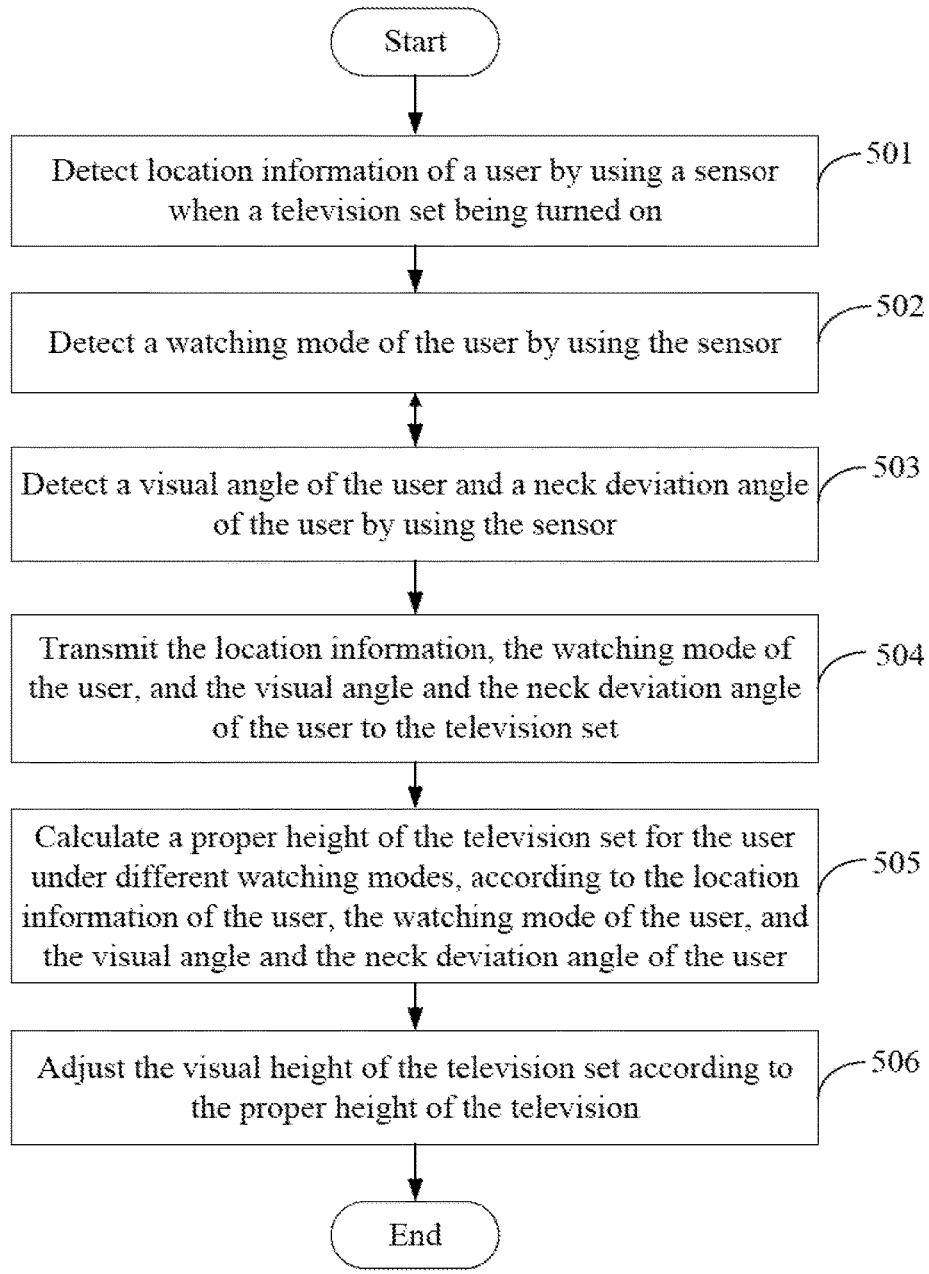
FIG. 5 is a flowchart illustrating an embodiment of a method for automatically adjusting a visual height of a television set.

FIG. 5 is a flowchart illustrating an example embodiment of a method for automatically adjusting the visual height of a television set. The method is provided by way of example, as there are a variety of ways to carry out the method. The method described below can be carried out using the configurations illustrated in FIG. 1 to FIG. 4, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 501.

At block 501, when a television set is turned on, the television set transmits a first control signal to the at least one sensor to control the at least one sensor detects location information of a user, wherein the location information of the user can include a distance between the eyes of the user and the center of a screen of the television set, a height between the eyes of the user and the seat the user is sitting on, and a posture height of the user.

At block 502, the at least one sensor detects a watching mode of the user, wherein the watching mode can include a sitting mode, a standing mode, and a lying mode.

At block 503, the at least one sensor detects a visual angle of the user and a neck deviation angle of the user.

At block 504, the at least one sensor transmits the detected location information of the user, the watching mode of the user, and the visual angle and the neck deviation angle of the user to the television set.

At block 505, a television height calculation module calculates a proper height of the television set for the user under different watching modes, according to the location information of the user, the watching mode of the user, and the visual angle and the neck deviation angle of the user. In detail, the television height calculation module calculates the proper visual height according to the following formula: $Y=A1+A2+A3$, wherein "Y" is the proper height of the television set 10; "A1" is the height between the eyes of the user and the center of the screen 11, wherein $A1=[L+b] \times \tan(\theta)$, "θ" is the visual angle of the user, $\tan(\theta)$ is tangent value of "θ", "a" is the horizontal distance between the eyes of the user and the center of the screen 11, $b=A2 \times \tan(\emptyset)$, "Ø" is the neck deviation angle of the user, tan(Ø) is the tangent value of "Ø", "A2" is the height between the eyes of the user and the seat the user is sitting on, and "A3" is the posture height of the user.

At block 506, a television height adjusting module transmits a second control signal to control a height adjusting apparatus to adjust the height of the television set according to the calculated proper height of the television set.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A television set connected to at least one sensor and a height adjusting apparatus, the television set comprising:
a processor;
a storage device coupled to the processor and configured to store instructions for execution by the processor to cause television set to:
transmit a first control signal to the sensor to control the sensor to detect personal data of a user when the television set being turned on, wherein the personal data of the user comprises location information of the user, a watching mode of the user, and a visual angle and a neck deviation angle of the user;
receive the personal data detected by the sensor;
calculate a proper visual height of the television set, according to the personal data received from the sensor; and
transmit a second control signal to the height adjusting apparatus to control the height adjusting apparatus so that the visual height of the television set is adjusted to be at the proper visual height;
wherein the location information of the user comprises a distance between eyes of the user and the center of a screen of the television set, a height between the eyes of the user and a seat the user is sitting on, and a posture height of the user; the posture height of the user being equal to the height of a seat if the user is sitting on the seat watching the television set; the posture height of the user being equal to the height of a bed if the user is lying in the bed watching the television set; and the posture height of the user being equal to the height of the horizontal plane the user is standing on if the user is standing on the horizontal plane watching the television set.

2. The television set according to claim 1, wherein the visual angle of the user is the angle between a sight line of the user and a vertical line of a screen of the television set, and the neck deviation angle of the user is the angle between the neck of the user and a vertical direction.

3. The television set according to claim 2, wherein the proper visual height is calculated according to the following formula: $Y=A1+A2+A3$, wherein "Y" is the proper height of the television set; "A1" is the height between the eyes of the user and the center of a screen of the television set, $A1=[L+b] \times \tan(\theta)$, "θ" is the visual angle of the user, tan(θ) is tangent value of "θ", "L" is the horizontal distance between the eyes of the user and the center of the screen, $b=A2 \times \tan(\emptyset)$, "Ø" is the neck deviation angle of the user, tan(Ø) is tangent value of "Ø", "A2" is the height between the eyes of the user and the seat the user sitting on, and "A3" is the posture height of the user.

4. The television set according to claim 1, wherein the watching mode comprises a sitting mode, a standing mode, and a lying mode.

5. The television set according to claim 1, wherein the television set communicates with the sensor via a communication channel, the communication channel is achieved by using a wired network, a wireless network, Near Field Communication, radio frequency identification devices, and QR code.

6. A method for automatically adjusting a visual height of a television set, the television set connected to a sensor and a height adjusting apparatus, the method comprising:
transmitting a first control signal to control the sensor to detect location information of a user when the television set being turned on;
detecting watching mode of the user by using the sensor;
detecting a visual angle of the user and a neck deviation angle of the user by using the sensor;
receiving the location information, the watching mode of the user, and the visual angle and the neck deviation angle of the user from the sensor;
calculating a proper visual height of the television set, according to the location information of the user, the watching mode of the user, and the visual angle and the neck deviation angle of the user received from the sensor; and
transmitting a second control signal to the height adjusting apparatus to control the height adjusting apparatus so that the visual height of the television set is adjusted to be at the proper visual height;
wherein the location information of the user comprises a distance between eyes of the user and the center of a screen of the television set, a height between the eyes of the user and a seat the user is sitting on, and a posture height of the user; the posture height of the user is equal to the height of a seat if the user is sitting on the seat watching the television set; the posture height of the user is equal to the height of a bed if the user is lying in the bed watching the television set; and the posture height of the user is equal to the height of the horizontal plane the user is standing on if the user is standing on the horizontal plane watching the television set.

7. The method according to claim 6, wherein the visual angle of the user is the angle between a sight line of the user and a vertical line of a screen of the television set, and the neck deviation angle of the user is the angle between the neck of the user and a vertical direction.

8. The method according to claim 7, wherein the proper visual height is calculated according to the following formula: $Y=A1+A2+A3$, wherein "Y" is the proper height of the television set; "A1" is the height between the eyes of the user and the center of a screen of the television set, $A1=[L+b] \times \tan(\theta)$, "θ" is the visual angle of the user, tan(θ) is tangent value of "θ", "L" is the horizontal distance between the eyes of the user and the center of the screen, $b=A2 \times \tan(\emptyset)$, "Ø" is the neck deviation angle of the user, tan(Ø) is the tangent value of "Ø", "A2" is the height between the eyes of the user and the seat the user sitting on, and "A3" is the posture height of the user.

9. The method according to claim 6, wherein the watching mode comprises a sitting mode, a standing mode, and a lying mode.

10. The method according to claim 6, wherein the location information, the watching mode of the user, and the visual angle and the neck deviation angle of the user is transmitted to the television set via a communication channel, the communication channel is achieved by using a wired network, a wireless network, Near Field Communication, radio frequency identification devices, and QR code.

\* \* \* \* \*